United States Patent [19]
Kmonk et al.

[11] 3,920,516
[45] Nov. 18, 1975

[54] NUCLEAR REACTOR FUEL ASSEMBLY ARRANGEMENT

[75] Inventors: Stanley Kmonk, Pittsburgh; David J. Sperhac, West Homestead, both of Pa.

[73] Assignee: Westinghouse Electric Corporation, Pittsburgh, Pa.

[22] Filed: Sept. 25, 1972

[21] Appl. No.: 292,240

[52] U.S. Cl. .................................................. 176/78
[51] Int. Cl. ............................................... G21c 3/34
[58] Field of Search ................................ 176/76, 78

[56] References Cited
UNITED STATES PATENTS

| | | | |
|---|---|---|---|
| 3,719,560 | 3/1973 | Mayers et al. | 176/78 |
| 3,736,227 | 5/1973 | Nakazato | 176/78 |
| 3,791,466 | 2/1974 | Patterson et al. | 176/76 |

FOREIGN PATENTS OR APPLICATIONS 2,023,587   11/1970   Germany ............................ 176/78

Primary Examiner—Harvey E. Behrend
Attorney, Agent, or Firm—J. R. Campbell

[57] ABSTRACT

A structural arrangement for a nuclear reactor fuel assembly. Top and bottom support plates, comprising fuel assembly outlet and inlet nozzles respectively, are separated by a plurality of metal tubes. Metal grids which serve to space and support fuel rods containing nuclear fuel are spaced along the length of the metal tubes. The metal grids are structurally attached to the metal tubes by sleeves, made of the same material as the metal tubes, which are spring loaded into the metal grid and spot welded to the metal tubes passing therein.

5 Claims, 9 Drawing Figures

NUCLEAR REACTOR FUEL ASSEMBLY ARRANGEMENT

CROSS REFERENCE TO RELATED APPLICATIONS

This invention is related to and is an improvement in the structure disclosed in U.S. Pat. No. 3,791,466, J. F. Patterson et al., entitled Low Parasitic Capture Fuel Assembly Structure, assigned to the same assignee as the present invention.

BACKGROUND OF THE INVENTION

1. Field of the Invention

This invention relates generally to fuel assemblies for nuclear reactors and more particularly to the structural arrangement of a fuel assembly for nuclear reactors.

2. Description of the Prior Art

A nuclear reactor is designed and operated for the purpose of initiating and maintaining a nuclear fission chain reaction in a fissile material for the generation of heat for power purposes. In a type of nuclear reactor to which this invention may be applied, for example, a pressurized water reactor, the fissile material is contained within fuel rods. Typically, the fuel rods consist of a number of small diameter fuel pellets axially disposed within a metal tube or cladding. A fuel assembly comprises an array of the fuel rods held in place and structurally supported by a fuel assembly structure.

In an open or canless type of fuel assembly which, for example may be used in a pressurized water reactor, the basic fuel assembly structure comprises a number of zirconium based alloy tubes known as zircaloy, held in place by upper and lower support plates and a plurality of grids interdisposed therebetween. In the past, the zirconium based alloy tubes were made of stainless steel, while the grids were made of a nickel base high temperature alloy marketed under the trademark Inconel. This allowed the tubes to be joined to the grids by a simple welding technique since both metals were of a similar nature. However, the neutronic penalty associated with stainless steel required that the tube material be changed to a zirconium based alloy known as zircaloy, which has a low neutron capture cross section. This change, unfortunately, was not without disadvantage. The simple joining of the tubes to the grids was no longer possible because of the now dissimilar metals. The solution ultimately achieved was to braze short lengths of stainless steel sleeves to the Inconel grids and to join mechanically the sleeves to the zircaloy tubes. The mechanical joint was obtained by inserting the tubes into the sleeves and then outwardly bulging both members in four circumferential locations at several axial locations along each stainless steel sleeve as shown in the above cited U.S. Pat. No. 3,791,466.

The prior art solution of mechanically joining zircaloy tubes to stainless steel sleeves which in turn are brazed to Inconel grids results in a number of fabrication, structural and fluid flow problems. Maintaining perpendicularity of the sleeves to the plane of the grid and parallelism of the sleeves with respect to each other requires extensive inspection, rework and reinspection. Radial misorientation of the square configuration resulting from bulging of the zircaloy tubes can result in unacceptable coolant flow blockage. In addition, the mechanical deformation of the zircaloy tubes occasionally results in unacceptable material cracks at the bulges. Further, the mechanical joint between the zircaloy tubes and the stainless steel sleeves has the effect of bowing the zircaloy tubes between grids which requires no additional zircaloy tube straightening operation.

SUMMARY OF THE INVENTION

This invention provides a strong but yet simple method for joining zircaloy tubes to Inconel grids thereby providing a structure for an open or canless type of fuel assembly such as might be used in a pressurized water reactor. Short lengths of tubing or sleeves made from a material which is suitable for welding to the zircaloy tubes is inserted into a grid cell. The sleeve configuration is such that the upper and lower edges of windows machined into the sleeve at 90° to each other contact the outer edges of the grid thereby axially locking the sleeve in position within the grid cell. Axial slots are provided along the length of the sleeve so that one end may be elastically deflected or collapsed to permit insertion into a grid cell. When full insertion is attained, the energy stored in the sleeve by the elastic deflection is released causing it to snap out over the edges of the grid. Since elastic deflection of the sleeve is also necessary for its removal, insertion of a zircaloy tube through the sleeve prevents deflection and hence mechanically captures the sleeve within the grid cells. The zircaloy tube is then metallurgically bonded, such as by spot welding, to the sleeve completing the joint.

Since the need for brazing the sleeve to the grid is eliminated by this invention, so too eliminated are the perpendicularity and parallelism problems of the prior art. With the present invention, these characteristics may easily be attained by standard machining techniques and good machining practices. Also, since mechanical bulging of the zircaloy tube is also eliminated, the possibility of flow blockage and structural cracks in the material are also eliminated.

BRIEF DESCRIPTION OF THE DRAWINGS

Other advantages of the invention will be apparent from the following detailed description taken in consideration with the accompanying drawings, in which.

DESCRIPTION OF THE PREFERRED EMBODIMENTS

Figure 1:
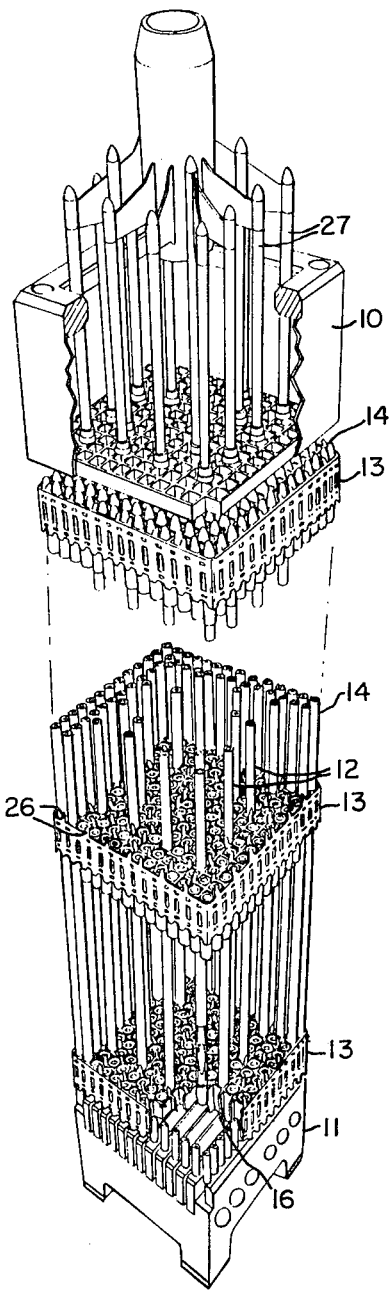
FIG. 1 is a simplified schematic of an open or canless fuel assembly to which this invention may be applied.

Throughout the description which follows, like reference characters indicate like elements in the various figures of the drawings.

Referring now, more particularly, to FIG. 1 of the drawings, an open or canless type of fuel assembly is illustrated. Upper and lower end structures, comprising an outlet nozzle 10 and an inlet nozzle 11 respectively, are separated by a plurality of elongated tubular structural members 12. The basic fuel assembly structure is completed by the addition of a plurality of grid members 13 longitudinally spaced along the tubular structural members 12. A plurality of fuel elements or rods 14, which contain nuclear fuel, are disposed within the grid members 13 in a generally square array. To avoid confusion, the full length of the fuel elements or rods 14 are not shown. The fuel elements 14 are held in place within the basic fuel assembly structure by the grids 13. Each of the grids 13 comprises a plurality of straps 16, shown in FIG. 2, interdisposed at right angles forming a partitioned structure having a plurality of openings or cells therein. The straps 16 comprising the grids 13 are provided with integral leaf springs 26 which engage the fuel elements 14 extending therein supporting the fuel elements 14 against lateral and axial displacement.

In the type of fuel assembly shown in FIG. 1, the elongated tubular structural members 12, in addition to forming part of the basic fuel assembly structure, serve as guide thimbles for cylindrical control elements 27 passing therein.

Figure 2:
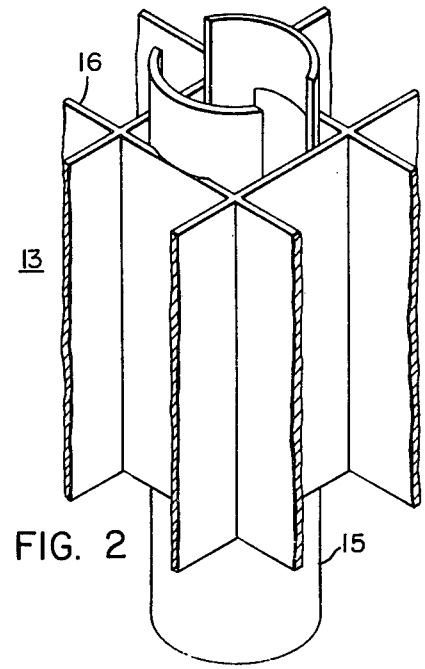
FIG. 2 is an isometric view of a cut away portion of a grid showing an elastically deflectable sleeve inserted and locked in a grid cell.
Figure 3:
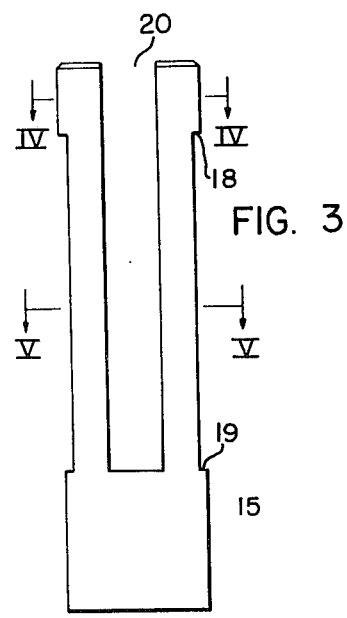
FIG. 3 is a detailed view of one type of sleeve as provided by this invention.
Figure 5:
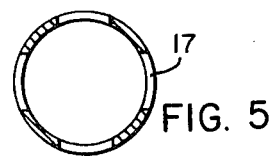
FIG. 5 is a view in section, taken along the line V—V in FIG. 3.

In order to reduce the quantity of high neutron capture cross section material in the fuel assembly, which acts as a nuclear poison, the tubes 12 are fabricated from zircaloy, a zirconium base alloy. The neutronic advantage gained by using a relatively low neutron capture cross section material such as zircaloy is somewhat offset by the mechanical complexities introduced by the need to fasten or join the zircaloy tubular structural members or guide thimbles 12 to the Inconel grid straps 16. Because the grid straps 16 and the tubular structural members or guide thimbles 12 are made from these dissimilar metals, normal metallurgical bonding techniques, such as welding or brazing, results in a brittle joint, which of course is unsatisfactory. The present invention simply and effectively eliminates or minimizes the disadvantages introduced by these dissimilar metals. A zircaloy sleeve 15, as shown in FIG. 3, is inserted in the appropriate cell of the grid 13 as shown in FIG. 2. The sleeve 15 is somewhat longer than the height of the grid straps 16 comprising the grid 13, such that a portion of the sleeve 15 protrudes above and below the cell of the grid 13 within which the sleeve 15 is inserted. Windows 17, equal in length to the height of the grid strap 16, are cut into the sleeve 15 at right angles to each other as shown in FIG. 5. The windows 17 in sleeve 15 serve two purposes. First, when inserted within the appropriate cell of grid 13, the upper and lower edges 18 and 19, respectively, of the windows 17 engage the upper and lower edges of the grid straps 16. In this way, the sleeve 15 is captured axially by the grid 13 preventing axial motion of the sleeve 15. Second, the windows 17 permit a maximum sized tubular structural member or guide thimble 12 to be used, that is, a guide thimble or tubular structural member 12 having an outside diameter equal to the inside, across flats dimensions of a grid cell formed by the intersection of adjacent grid straps 16. It is to be observed that the windows 17 permit the use of a sleeve 15 having an outside diameter greater than the inside, across flats dimension of the cell in grid 13. This unique feature of the present invention, in addition to permitting the use of a maximum sized guide thimble or tubular structural member 12, as explained above, prevents the sleeve 15 from rotating within the cell of grid 13. Thus, if the dimensions of the windows 17 are carefully chosen and the sleeve 15 is accurately machined, then the need for metallurgical bonding of the sleeve 15 to the grid 13 is eliminated.

Figure 4:
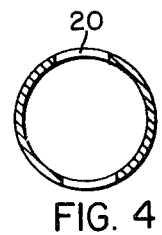
FIG. 4 is a view in section, taken along the line IV—IV in FIG. 3.

As shown in FIGS. 3 and 4, at least one but preferably two of the four windows 17 are machined through to the upper edge of sleeve 15 forming slots 20. The slots 20 permit the sleeve 15 to be elastically deformed by squeezing in order to pass the larger outside diameter of the sleeve 15 through the smaller across flats dimension of the cell in grid 13 during assembly. When fully inserted, the edge 19 of sleeve 15 will come in contact with the lower edge of grid straps 16, at which time the squeezing pressure is released and the upper edges 18 of sleeve 15 snap into position over the upper edges of grid strap 16. The sleeve 15 is now firmly locked into position within the cell in grid 13.

Figure 6:
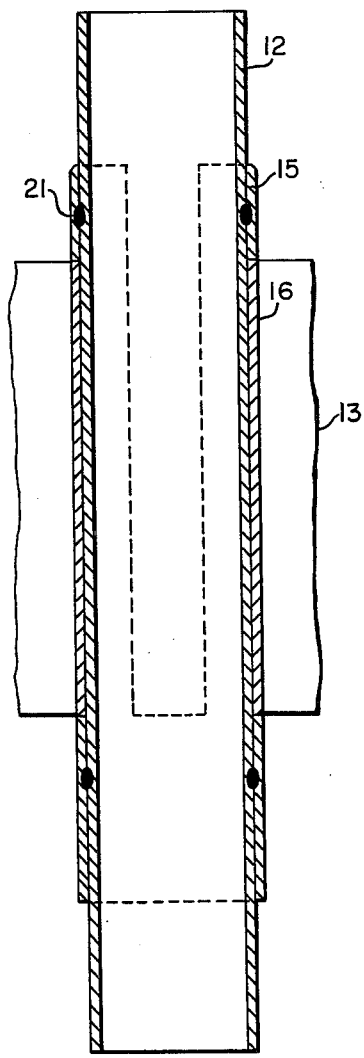
FIG. 6 is a detailed view, in section, of a gridthimble joint exemplifying principal features of the invention.

The completed grid-thimble joint is shown in FIG. 6. A guide thimble or tubular structural member 12 is inserted within a sleeve 15 which has been firmly attached to grid 13 as hereinbefore described. The clearance between the outside diameter of guide thimble or tubular structural member 12 and the internal diameter of sleeve 15 is sufficiently small such that sleeve 15 cannot be elastically deflected to any significant degree. Thus, the sleeve 15 is firmly locked into position in grid 13. The grid-thimble joint is completed by metallurgically bonding, such as by spot welding 21, the protruding portions of sleeve 15 to guide thimble or tubular structural member 12. A weld joint is now permissible since both components are made from the same zirconium based alloy, zircaloy.

Figure 7:
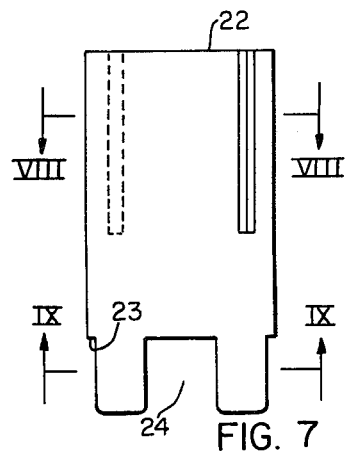
FIG. 7 is a detailed view of another type of sleeve as provided by this invention.
Figure 8:
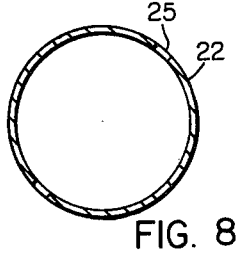
FIG. 8 is a view, in section, taken along the line VIII—VIII in FIG. 7.
Figure 9:
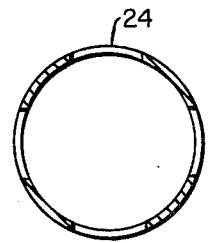
FIG. 9 is a view, in section, taken along the line IX—IX in FIG. 7.

A variation of the zircaloy sleeve, as provided by this invention, is shown in FIG. 7. In this embodiment, two sleeve 22 are required for each grid-thimble joint. One sleeve 22 is inserted into the grid cell from above the grid 13, while a second sleeve 22 is inserted from below the grid 13. In each case, the length of insertion into the grid cell is fixed by the edges 23 of cut outs 24 provided in each sleeve 22. Here, the cut outs 24 serve the same purpose as the windows 17 in sleeve 15 shown in FIGS. 3 and 5. Similarly, the edges 23 serve the same purpose as the edges 18 and 19 of sleeve 15. FIG. 9 clearly shows the cross sectional and functional similarities between sleeve 15 and sleeve 22. Slots 25, in the portion of sleeve 22 which protrude above and below the grid cell in grid 13 allows radial deflection of sleeves 22 to effectuate contact between the outer diameter of guide thimble or tubular structural member 12 and the inner diameter of sleeves 22 so that a satisfactory weld may be accomplished.

From the foregoing description, taken in connection with the drawings, it is seen that this invention provides a grid-thimble joint which is a substantial improvement over that of the prior art. The basic fuel element structure is in part fabricated from materials having low neutron capture cross section while the critical grid-thimble joint is obtained without any reduction in overall fuel assembly structural strength or integrity. The joint is so constructed that the need to metallurgically bond dissimilar materials is eliminated. Also, the need to elastically and permanently deform a structural member within the basic fuel assembly structure is eliminated. The joint hereby provided is accomplished by snapping a sleeve into place within a grid cell and then welding a guide thimble to the sleeve.

Since numerous changes may be made in the above described apparatus, different embodiments of the invention may be made without departing from the spirit and scope thereof, it is intended that all matter contained in the foregoing description or shown in the accompanying drawings shall be incorporated as illustrative and not in a limiting sense.

We claim as our invention:

1. A fuel assembly for a nuclear reactor including an array of generally parallel elongated fuel rods,
   a plurality of elongated structural members, said structural members having an axial opening therethrough and being made of a metal having low neutron capture cross section,
   support plate members located at opposite sides of said fuel rods and structural members for providing support thereto,
   at least one member spaced along the length of said structural tube members, said grid member comprising coacting straps defining openings through which said structural members and said fuel rods extend, and
   retaining means positioned within said openings between the structural members and the strap walls of said grid member,
   each of said retaining means comprising a hollow sleeve member having an outer diameter slightly greater than the distance between the opening defined by said straps,
   windows in said sleeve member which receive said straps when the sleeve member is positioned in said opening, and
   said sleeve member having elastically deflectable sections formed by slotted means which permit sleeve member deflection in a radial direction to allow insertion of the sleeve member in said opening,
   whereby upon insertion and release of the sleeve member end, the sleeve member windows snap over the edges of said straps thereby immovably locking the sleeve member in the grid member opening.

2. The fuel assembly of claim 1, wherein said sleeve member comprises a metal similar to the metal in said structural member and is metallurgically bonded thereto.

3. The fuel assembly of claim 1, wherein said slotted means for elastically deflecting said sleeve member in a radial direction comprises at least one elongated slot through the surface thereof said slot beginning at one edge and extending axially along a major portion of said sleeve member length.

4. A fuel assembly for a nuclear reactor including an array of generally parallel elongated fuel rods, a plurality of elongated structural members, said structural members having an axial opening therethrough and being made of a metal having low neutron capture cross section, a plurality of grid members spaced along the length of said structural members, said grid members comprising coacting straps defining openings through which said structural members and said fuel rods extend, and retaining means positioned within said openings through which the structural members extend for attaching said structural members to said grid members, each of said retaining means comprising a flexible tubular sleeve member,
   a pair of oppositely disposed elongated slots in said sleeve member beginning at one edge and extending axially along the length thereof for permitting elastic deflection for said sleeve member in a radial direction and thereby facilitating its insertion in a grid member opening,
   oppositely disposed windows at 90° intervals in said sleeve member of a size sufficient to bridge the height of said straps, so that when the sleeve member is radially deflected and inserted in said opening, the window edges snap over said straps thereby locking the sleeve member in said grid member, and
   means metallurgically bonding said tubular sleeve member to said structural members thereby imparting rigidity to the fuel assembly.

5. A fuel assembly for a nuclear reactor including an array of generally parallel elongated fuel rods, a plurality of elongated structural members, said structural members having an axial opening therethrough and being made of a metal having low neutron capture cross section, at least one grid member spaced along the length of said structural members, said grid member comprising coacting straps defining openings through which said structural members and said fuel rods extend, and retaining means positioned within said openings through which the structural members extend for attaching said structural members to said grid member, and retaining means comprising two tubular sleeve members which are positioned end to end in said openings, each of said sleeve members having a plurality of slots therein, each of said slots extending axially from one edge of said sleeve member, to define edges which serve to interlock with the edges of said straps forming the openings in said grid member, and means metallurgically bonding said tubular sleeve members to said structural members extending therethrough.

\* \* \* \* \*